Oct. 23, 1945. W. C. HENRY ET AL 2,387,511
COLLET CHUCK
Filed Oct. 19, 1943 2 Sheets-Sheet 1
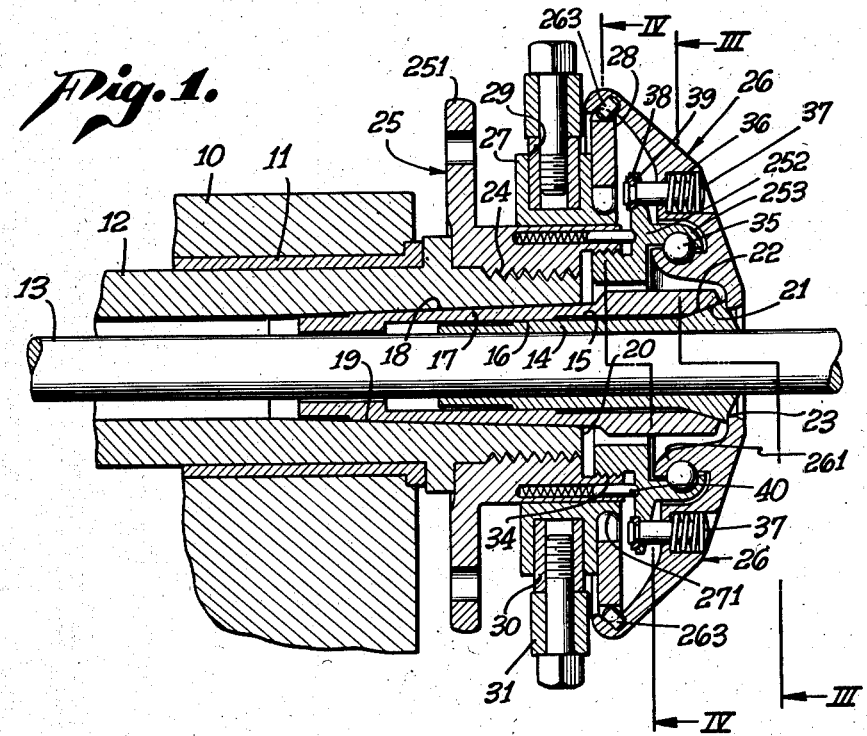
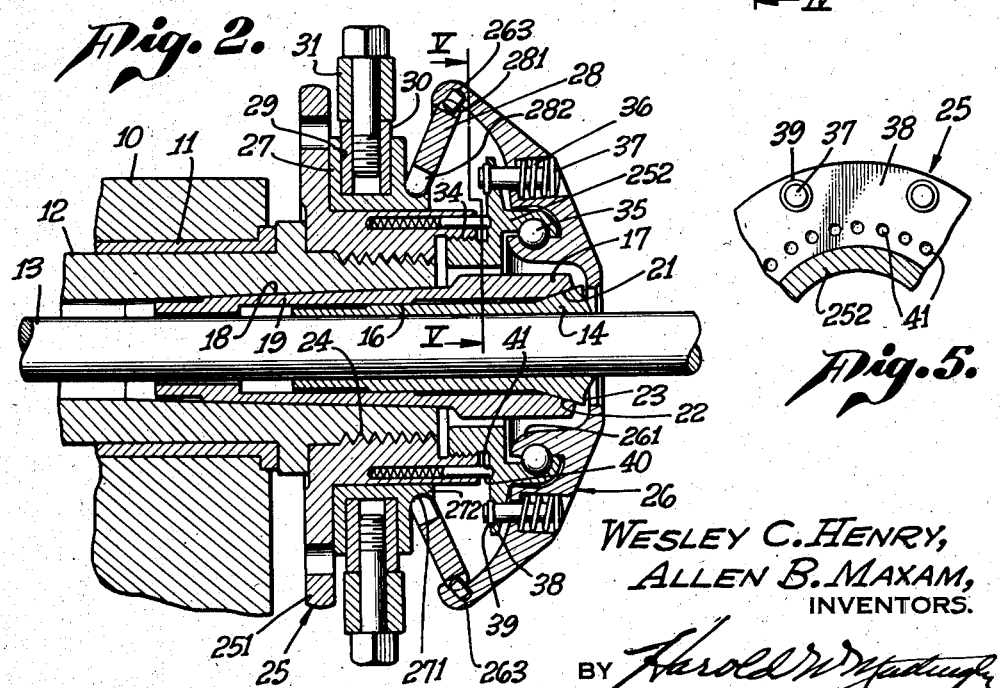
WESLEY C. HENRY,
ALLEN B. MAXAM,
INVENTORS.
BY *Harold W. Mading*
ATTORNEY.

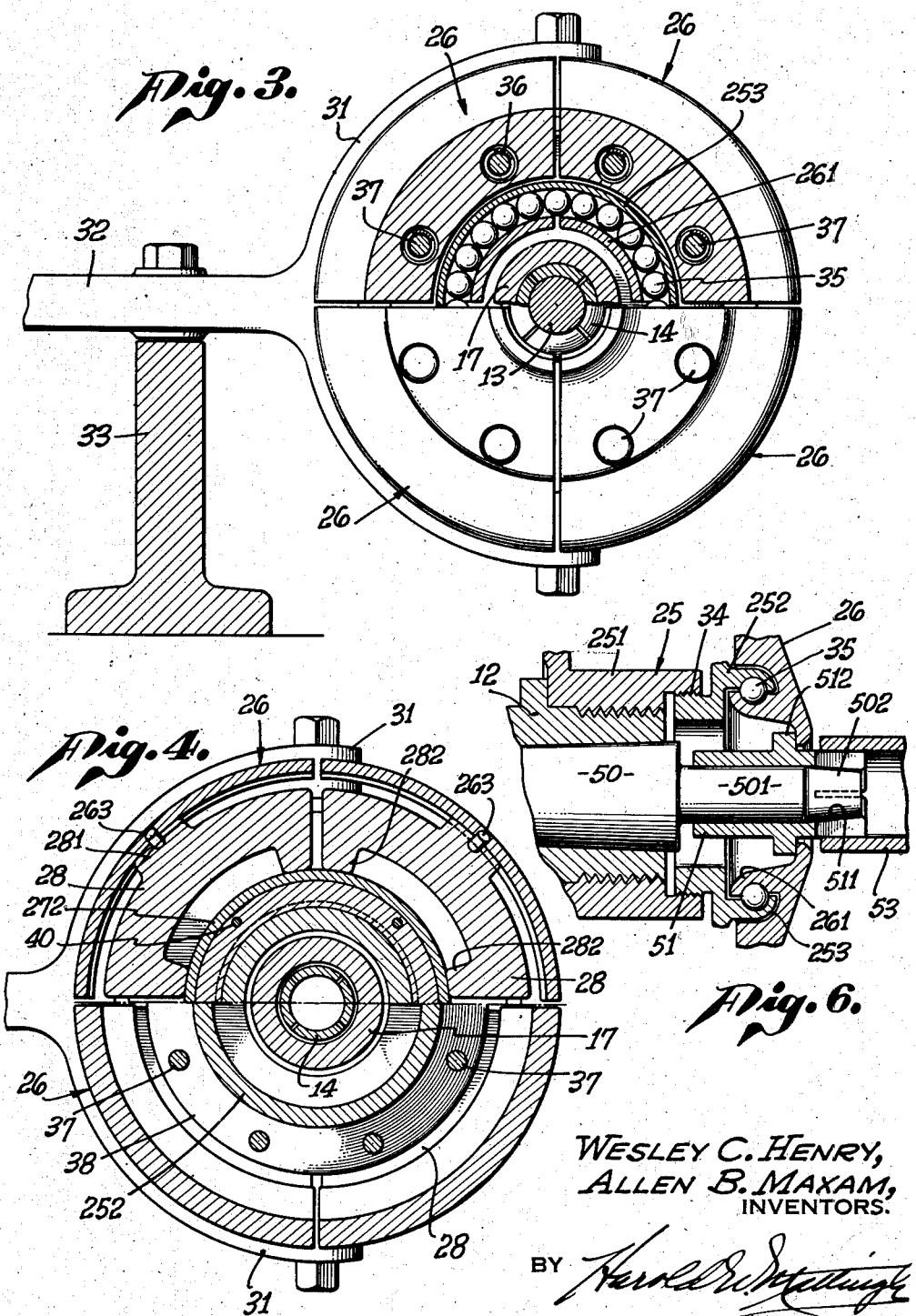

Patented Oct. 23, 1945

2,387,511

UNITED STATES PATENT OFFICE 2,387,511

COLLET CHUCK

Wesley C. Henry, Burbank, and Allen B. Maxam, Glendale, Calif.

Application October 19, 1943, Serial No. 506,800

6 Claims. (Cl. 279—51)

This invention relates to chucks for lathes and the like and more particularly to collet chucks.

An object of the invention is to provide a particularly simple and positive mechanism for rapidly contracting and expanding a collet chuck and at the same time exerting a relatively powerful contracting force on the chuck to grip a workpiece therewithin.

Another object is to provide a collet chuck structure in which the gripping movement can be quickly and easily adjusted to compensate for variations in the size of the workpieces and for wear in the mechanism.

Other objects and features of the invention will become apparent from the detailed description to follow of a preferred embodiment of the invention illustrated in the drawings.

Briefly, the present invention comprises a collet chuck structure adapted to be used with a conventional lathe having a hollow spindle and consists of a split sleeve adapted to surround the workpiece and a tapered sleeve concentric with the split sleeve for wedging the split sleeve about the workpiece in response to longitudinal movement between the two sleeves. The tapered sleeve is fixed within the spindle of the lathe as by having a gradually tapered outer surface adapted to wedge into the conventional tapered bore of the spindle. Longitudinal force is applied to the split sleeve to force it into the tapered sleeve by a lever and toggle mechanism mounted on a carrier which is screwed on to the outer threaded surface of the lathe spindle.

This lever and toggle mechanism comprises a plurality of circumferentially disposed levers on the nose of the assembly, the levers contacting a shoulder on the split sleeve at their inner ends and being moved to exert longitudinal force on the split sleeve by a plurality of toggles pivotally positioned between the outer ends of the levers and a collar which is slidable longitudinally and actuated forward and backward by a control handle to lock and release the workpiece.

To provide for adjustment of the longitudinal position of the inner ends of the levers with respect to the split sleeve, the levers are fulcrumed on a longitudinally adjustable mounting which is threaded into a separate mounting carrying the actuating collar so that, by rotating the lever mounting, it can be accurately shifted longitudinally to any desired extent and may be releasably locked in any desired position of adjustment by a simple spring detent mechanism.

In the drawings:

Fig. 1 is a longitudinal section through a chuck mechanism in accordance with the invention, the mechanism being shown mounted on the spindle of a lathe and being shown in closed position to grip the workpiece;

Fig. 2 is a view similar to Fig. 1 but showing the chuck in open position to release the workpiece;

Fig. 3 is a cross section taken along the line III—III of Fig. 1;

Fig. 4 is a cross section taken along the line IV—IV of Fig. 1;

Fig. 5 is a detail section taken along the line V—V of Fig. 2; and

Fig. 6 is a detail section of a portion of the mechanism of Fig. 1 showing an adaptation of the invention for mandrel work.

Referring to Figs. 1 and 2, there is shown the conventional headstock 10 of a lathe and bearing 11 thereof which rotatably supports the conventional hollow spindle 12 through which a workpiece 13 is extended and gripped by a collet chuck in accordance with the invention.

This collet chuck comprises a collet sleeve 14 internally dimensioned to fit and grip the workpiece 13 and having an outer cylindrical surface 15 which is slidable longitudinally in a cylindrical surface 16 of a supporting sleeve 17, the latter having an outer tapered surface 18 adapted to wedge into a tapered end portion 19 of the bore of the lathe spindle 12.

The sleeve 17 projects forwardly beyond the end 20 of the spindle 12 and is thickened at its outer end to reinforce it. At its extreme outer end it has a tapered inner surface 21 which fits against a corresponding tapered surface 22 on the end of the collet sleeve 14 so that by forcing the collet sleeve rearwardly with respect to the supporting sleeve 17, the collet sleeve is contracted about the workpiece 13 to snugly engage and drive it. The collet sleeve is forced rearwardly as described by exerting pressure against a shoulder 23 on its forward end by a mechanism next to be described.

There is screwed on to the usual external threads 24 of the lathe spindle 12 a carrier 25 which supports four levers 26 circumferentially arranged around the axis of the workpiece, a sliding actuating collar 27, and a plurality of toggle links 28, one associated with each of the levers 26. The collar 27 has an annular groove 29 which receives a pair of trunnions 30 on the forked end 31 (Fig. 3) of a handle 32 which is pivotally mounted for swinging movement on a post 33 which is secured to the frame of the lathe.

When the handle is in one extreme position, the collar 27 is in the forward position shown in Fig. 1 in which the toggle links 28 extend substantially radially between the collar and the levers, and the tips of the levers bear against the shoulder 23 on the collet sleeve to wedge it into the supporting sleeve 17 and cause it to engage the workpiece. When the handle 32 is in its other extreme position, the collar 27 is moved into the rear position, shown in Fig. 2, in which the toggle links 28 extend forwardly, and the inner ends of the levers 26 are retracted away from the shoulder 23 on the collet sleeve so that it can move forwardly, thereby separating the tapered surfaces 21 and 22 on the supporting sleeve and the collet sleeve, respectively, to release the workpiece.

Considering now the detailed structure of my mechanism, the carrier 25 is formed in two sections 251 and 252, respectively, which are adjustably connected with each other by screw threads 34 so that the longitudinal position of the section 252 can be adjusted by rotating it with respect to the section 251, and since the levers 26 are fulcrumed to section 252, their longitudinal position is also adjusted.

The levers 26 are fulcrumed to the carrier section 252 by a row of ball bearings 35 which fit into an internal race in a forwardly extending flange 253 on the carrier section 252 and exterior races in rearwardly extending flanges 261 in the levers 26. Thus, referring to Fig. 3, the levers 26 are four in number and each extends substantially over a full quadrant so that together the races in the flanges 261 of the four levers form an approximately continuous race for retaining the balls 35.

Since the ball races are arcuate, whereas the levers swing in radial planes, the races are made sufficiently large to permit the desired fulcrum action. However, this fulcrum action is not very great since only slight movement of the inner ends of the levers suffices to engage and disengage the collet sleeve with the workpiece.

Each lever 26 is yieldably urged into disengaged position by a pair of helical compression springs 36 which are positioned in recesses in the forward face of the lever and compressed between the bases of the recesses and heads 37 of pins extended rearwardly through the lever and through holes provided therefor in a radial flange 38 on the carrier section 252. The pins 37 are circumferentially grooved near their inner ends and provided with split washers 39 for preventing their withdrawal from the carrier flange 38.

The outer end of each lever 26 contacts a central projection 281 on its associated toggle link 28, the latter being slightly less than 90° in arcuate extent as shown in Fig. 4, and being recessed at their inner edges except at the ends where fingers 282 are left to bear against the actuating collar 27. The inner ends of the fingers 282 are rounded to fit within an external groove 271 in a forwardly extending flange 272 on the collar 27. Each toggle link 28 is circumferentially positioned with respect to its associated lever 26 by a pin 263 which fits in a hole provided therefor in the lever and engages a longitudinal groove in the center of the projection 281.

As has been previously stated, adjustment of the pressure exerted by the levers 26 on the shoulder 23 of the collet sleeve can be varied by rotating the carrier section 252 with respect to the carrier section 251. This rotation is effected by simply engaging the levers 26 with the hand and rotating the entire assembly of the levers and the carrier section 252. To yieldably retain the carrier section 252 in a desired position, I provide a plurality of spring detents 40 on the carrier section 251 which project into shallow spaced recesses 41 (Fig. 5) in the rear surface of the carrier section 252.

The operation of the mechanism is obvious from the description of the structure. It will be observed that in Fig. 2 the actuating collar 27 is in release position in which it has moved rearwardly against a flange on the carrier section 251, and the toggle links 28 have rocked substantially rearwardly at their inner ends to permit the springs 36 to retract the inner ends of the levers 26, thereby permitting the collet sleeve 14 to move forwardly with respect to the supporting sleeve 17, the collet sleeve expanding away from the workpiece 13 as it does so, thereby permitting the workpiece to be fed or advanced into a new position. Thereafter the handle 32 is actuated to shift the collar 27 into its forward position as shown in Fig. 1 in which the toggle links 28 extend very slightly beyond a position perpendicular to the longitudinal axis so that the radial forces applied to the toggle links by the levers retain the collar in position.

It is to be noted that the only stop determining the forward movement of the actuating collar 27 constitutes the toggle links 28 themselves which contact the front face of the collar 27. This is advantageous since it insures that the toggle links will always stop in position nearly perpendicular to the axis of the machine, irrespective of the adjustment between the carrier section 252 and the carrier section 251.

There is shown in Fig. 6 a modification of the construction so that the quick release mechanism can be used with an expansible mandrel for mandrel work as well as with a contractable sleeve for collet work. Parts in Fig. 6 corresponding to those in Fig. 1 bear the same reference numerals. It will be observed that the only change made is in the substitution for the collet sleeve 14 and the supporting sleeve 17 of a mandrel 50 and a sleeve 51. The mandrel 50 takes the place of the supporting sleeve 17 of Fig. 1 having a tapered base portion adapted to wedge into the tapered bore of the spindle 12. On its forward end this mandrel 50 carries a cylindrical extension 501 which slidably supports the rear portion of the sleeve 51 and has at its forward end a tapered portion 502 which engages the corresponding tapered inner surface 511 of the split end of the sleeve 51.

In addition, the sleeve 51 has a flange 512 which corresponds in function to the shoulder 23 on the collet sleeve 14 of Fig. 1, this shoulder 512 being forced rearwardly by the tips of the levers 26 when the latter are actuated by the collar 27.

As the split sleeve 51 rides back on the mandrel 50, the tapered end 502 of the latter expands the outer end of the sleeve 51 to cause it to engage the inner bore of a workpiece 53 with which it is to be used.

While we have illustrated the supporting sleeve 17 as extending into the bore of the lathe spindle, it will be apparent to those skilled in this art that a short sleeve may be substituted therefor fitted to the bore 60 of the carrier member 251, thus permitting the use of a larger diameter collet and accommodating workpieces 13 of substantially the same diameter as the diameter of the lathe spindle bore.

While we have shown and described a preferred embodiment of our invention, we do not desire to be limited to any of the details of construction shown or described, except as defined in the appended claims.

We claim:

1. In a chuck of the type described for use with a hollow rotating drive spindle; a radially expansible and contractable sleeve member for releasably gripping a workpiece; a cooperating tapered actuating member in concentric relation with said sleeve member for varying the diameter thereof to cause it to engage the workpiece in response to relative longitudinal movement between said members, one of said members being adapted to be fixed to said drive spindle and the other member having a shoulder thereon for receiving a longitudinal thrust to move it longitudinally with respect to said one member and cause said sleeve member to engage the workpiece; and means for applying thrust to said shoulder, said means comprising: a hollow carrier adapted to be secured to said drive spindle in concentric relation with said members; a plurality of levers fulcrumed on said carrier for movement in radial planes, each lever having an inner end adapted to move against said shoulder for applying longitudinal thrust thereto and having an outer end movable with a substantial radial component; an actuating collar longitudinally slidable on said carrier and means for shifting it longitudinally in either direction; and a plurality of toggle links, one for each of said levers, each toggle link being pivotally connected to said actuating collar at its inner end and pivotally connected to the associated lever at its outer end and being movable into substantially radially extending position in response to actuation of said collar in direction to engage said sleeve member with the workpiece.

2. In a chuck of the type described for use with a hollow rotating drive spindle; a radially expansible and contractable sleeve member for releasably gripping a workpiece; a cooperating tapered actuating member in concentric relation with said sleeve member for varying the diameter thereof to cause it to engage the workpiece in response to relative longitudinal movement between said members, one of said members being adapted to be fixed to said drive spindle and the other member having a shoulder thereon for receiving a longitudinal thrust to move it longitudinally with respect to said one member and cause said sleeve member to engage the workpiece; and means for applying thrust to said shoulder, said means comprising: a hollow carrier adapted to be secured to said drive spindle in concentric relation with said members; a plurality of levers fulcrumed on said carrier for movement in radial planes, each lever having an inner end adapted to move against said shoulder for applying longitudinal thrust thereto and having an outer end movable with a substantial radial component; an actuating collar longitudinally slidable on said carrier and means for shifting it longitudinally in either direction; and a plurality of toggle links, one for each of said levers, each toggle link being pivotally connected to said actuating collar at its inner end and pivotally connected to the associated lever at its outer end and being movable into substantially radially extending position in response to actuation of said collar in direction to engage said sleeve member with the workpiece, the structure for fulcruming said levers on said carrier comprising an annular flange on the end of said carrier, said flange having a ball race on its inner suface, and said levers having flanges containing arcuate ball races juxtaposed to said race in the carrier and a continuous row of balls between said races.

3. In a chuck of the type described for use with a hollow rotating drive spindle; a radially expansible and contractable sleeve member for releasably gripping a workpiece; a cooperating tapered actuating member in concentric relation with said sleeve member for varying the diameter thereof to cause it to engage the workpiece in response to relative longitudinal movement between said members, one of said members being adapted to be fixed to said drive spindle and the other member having a shoulder thereon for receiving a longitudinal thrust to move it longitudinally with respect to said one member and cause said sleeve member to engage the workpiece; and means for applying thrust to said shoulder, said means comprising: a hollow carrier adapted to be secured to said drive spindle in concentric relation with said members; a plurality of levers fulcrumed on said carrier for movement in radial planes, each lever having an inner end adapted to move against said shoulder for applying longitudinal thrust thereto and having an outer end movable with a substantial radial component; an actuating collar longitudinally slidable on said carrier and means for shifting it longitudinally in either direction; and a plurality of toggle links, one for each of said levers, each toggle link being pivotally connected to said actuating collar at its inner end and pivotally connected to the associated lever at its outer end and being movable into substantially radially extending position in response to actuation of said collar in direction to engage said sleeve member with the workpiece, said toggle links each extending arcuately about the axis of said spindle into close proximity with the next adjacent toggle links and bearing against said actuating collar at their arcutae ends and bearing against the associated levers substantially intermediate their arcuate ends, and means for preventing arcuate movement of said toggle links with respect to their associated levers.

4. In a collet chuck for use with a rotating drive spindle and including a work holding sleeve member contractable about a workpiece in response to inward axial movement of said member relative to said spindle, an operating mechanism comprising: a carrier secured to said spindle and surrounding said sleeve member; a plurality of sleeve-engaging levers having inner ends engaging the outer end of said sleeve; means pivotally mounting said levers on said carrier for limited substantially axial movement of said inner ends in response to radial movement of said inner ends in response to radial movement of the other ends thereof; an actuating member slidable along said carrier; and a plurality of toggle links, one for each of said levers, each of said links being pivotally connected at the outer end to said other end of the associated lever and having its inner end engaging said actuating member to be moved thereby from an inclined position to a substantially radial position.

5. In a collet chuck for use with a rotating drive spindle and including a work holding sleeve member contractable about a workpiece in response to inward axial movement of said member relative to said spindle, an operating mechanism comprising: a support secured to said spindle and surrounding said sleeve member; a carrier threadedly secured to said support for axial adjustment relative thereto in response to relative rotation of said support and carrier; a plurality of sleeve-engaging levers having inner ends engaging the outer end of said sleeve; means pivotally mounting said levers in said carrier for limited substantially axial movement of said inner ends in response to radial movement of the other ends thereof; an actuating member slidable along said carrier; a plurality of toggle links, one for each of said levers, each of said links being pivotally connected at the outer end to said other end of said associated lever and having its inner end engaging said actuating member to be moved thereby from an inclined position to a substantially radial position, whereby the extent of the axial inward movement imparted to said work-holding sleeve may be adjusted by relative rotation of said carrier and said support; and a spring detent device inter-engaging said carrier and said support for yieldably holding said carrier and support against said relative rotation.

6. In a collet chuck for use with a rotating drive spindle and including a workholding sleeve member contractable about a workpiece in response to inward axial movement of said member relative to said spindle, an operating mechanism comprising: a carrier secured to said spindle and surrounding said sleeve member; a plurality of sleeve-engaging levers having inner ends engaging the outer end of said sleeve; means pivotally mounting said levers and said carrier for limited substantially axial movement of said inner ends in response to radial movement of the other ends thereof; an actuating member slidable along said carrier and defining a radial stop face; a plurality of toggle links, one for each of said levers, each of said links being pivotally connected at the outer end to said other end of the associated lever and having its inner end engaging said actuating member immediately adjacent said stop face to be pivotally moved from an inclined position to a substantially radial position by sliding movement of said actuating member, in which latter position said toggle links engage said stop face and arrest said sliding movement.

WESLEY C. HENRY.
ALLEN B. MAXAM.